United States Patent

[11] Patent Number: 6,156,370
[45] Date of Patent: *Dec. 5, 2000

Huizinga et al.

[54] PROCESS FOR MAKING A MARGARINE HARDSTOCK FAT BLEND

[75] Inventors: Hindrik Huizinga, Maassluis; Cornelis Laurentius Sassen, Schiedam; Leo Frans Vermaas, Maassluis, all of Netherlands; Paul Schur, Willowdale, Canada

[73] Assignee: Van den Bergh Foods, Co., division of Conopco, Inc., Lisle, Ill.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 09/201,304

[22] Filed: Nov. 30, 1998

Related U.S. Application Data

[62] Division of application No. 08/573,998, Dec. 18, 1995, Pat. No. 5,858,445.

[30] Foreign Application Priority Data

Dec. 22, 1994 [EP] European Pat. Off. ............... 94203727

[51] Int. Cl.$^7$ ................................. A23D 3/02; A23D 5/00
[52] U.S. Cl. ............................................. 426/607; 426/603
[58] Field of Search ...................................... 426/607, 603, 426/33

[56] References Cited

U.S. PATENT DOCUMENTS

| | | | |
|---|---|---|---|
| 4,366,181 | 12/1982 | Dijkshoorn | 426/607 |
| 4,386,111 | 5/1983 | Van Heteren | 426/607 |
| 4,390,561 | 6/1983 | Blair | 426/607 |
| 4,425,371 | 1/1984 | Stratmann | 426/603 |
| 4,447,462 | 5/1984 | Tafuri | 426/607 |
| 4,610,889 | 9/1986 | Schmidt | 426/607 |
| 4,791,000 | 12/1988 | Holemans | 426/607 |
| 5,407,695 | 4/1995 | Wheeler | 426/607 |
| 5,858,445 | 1/1999 | Huizinga | 426/607 |

FOREIGN PATENT DOCUMENTS

| | | |
|---|---|---|
| 2098314 | 12/1994 | Canada . |
| 078568 | 5/1983 | European Pat. Off. . |
| 089082 | 9/1983 | European Pat. Off. . |

*Primary Examiner*—Carolyn Paden
*Attorney, Agent, or Firm*—Edward A. Squillante, Jr.

[57] ABSTRACT

A margarine fat blend and a plastic W/O emulsion spread comprising 5–14% of a hardstock being a stearin fraction of an interesterified mixture of 25–65% unhardened lauric fat stearin and 75–35% unhardened $C_{16+}$ fat stearin. Also provided is a process for preparing such hardstock without the use of chemical modification or solvent or Lanza fractionation. As byproduct of this process an olein fraction can be obtained suitable for use in cooking or baking fats or W/O emulsion spreads.

13 Claims, No Drawings

PROCESS FOR MAKING A MARGARINE HARDSTOCK FAT BLEND

This is a divisional of Ser. No. 08/573,998, filed Dec. 18, 1995, now U.S. Pat. No. 5,858,445.

FIELD OF THE INVENTION

The invention relates to plastic W/O emulsion spreads and fat blends for use therein. The invention particularly relates to fat blends suitable for manufacturing plastic W/O emulsion spreads having a high liquid oil content, little or no hardened fat, substantially no trans-unsaturated fatty acid content and a relatively low level of saturated fatty acids. It also relates to a process for preparing a hardstock that is suitable for use in this fatblend.

BACKGROUND OF THE INVENTION

For manufacturing plastic W/O emulsion spreads, e.g. margarine, a margarine fat should be used having a well balanced ratio of liquid and solid fats throughout the entire area of use temperatures which usually is from 5° C. to about 20° C.

Historically attempts were made to meet this aim by using blends of natural fats having a sufficient solids content, resulting however in products of unsatisfactory spreadability, consistency and mouthfeel. The use of mixtures of fats hardened to different degrees of saturation is another approach, but for nutritional reasons in recent years the desire is expressed that the level of saturated fatty acids (SAFA) of the component triacyl glycerides of the fats should be kept as low as possible.

W/O emulsion spreads have, been on the market for some time aiming to meet this need. Typically, the margarine fat of these products consists of about 87% liquid oil, e.g. sunflower oil and 13% of a hardstock consisting of a randomly interesterified mixture of fully hardened lauric fat, e.g. fully hardened palmkernel oil, and fully hardened palm oil.

In order to allow the use of even less hardstock in the margarine fat, EP 89,082 recommended $H_2M$ rich hardstocks. The preferred method described in EP 89,082 for producing such hardstock is randomly interesterifying a partly or fully hydrogenated lauric fat having a melting point nging from 30 to 41° C., with a fat, which can be fully or partly hydrogenated, fractionated or non-fractionated, wherein at least 60% of the fatty acid residues are $C_{16}$- or $C_{18}$-fatty acid residues. This $C_{16}$–$C_{18}$ fat is preferably selected from palmfat, soybean oil, groundnut oil, sunflower oil, maize oil, rapeseed oil, having a melting point ranging from 50 to 71° C.; and fractionating the interesterified mixture. Fractionation is preferably done in an organic solvent. The examples of EP 89,082 illustrate spreads comprising margarine fats containing 90 or even 93% sunflower oil and only 7 or 10% hardstock. This hardstock is produced by means of 2 stage fractionation in acetone to obtain a midfraction of a randomly interesterified mixture of 50 parts fully hydrogenated palmkernel fat and 50 parts fully hydrogenated palm fat.

Nowadays there are consumers who express concern about chemically modifying fats e.g. by hydrogenating or hardening, which may result in trans-unsaturation if partial hardening is involved.

To meet the need for spreads with low contents of SAFA in the margarine fat which have been produced without using hydrogenation, CA 2 098 314 proposes to prepare hardstock by chemically interesterifying a blend of generally equal proportions of palm stearin and palmkernel stearin. This hardstock should have the following solid fat contents as measured by AOCS method CD 16-81:

| Temp (° C.) | % Solids | Variance ± x |
|---|---|---|
| 5 | 70.49 | 2% |
| 10 | 64.45 | 2% |
| 20 | 49.83 | 2% |
| 25 | 45.66 | 2% |
| 30 | 34.13 | 2% |
| 35 | 22.17 | 2% |
| 40 | 10.90 | 2% |

To obtain the margarine fat for producing the spread 14–21.1%, preferably 14.5–16%, especially about 16% of this hardstock is blended with the balance of vegetable oil, e.g. olive oil, canola oil and/or sunflower oil.

This approach of CA 2 098 314 results in products with higher SAFA contents and lower cis unsaturated fatty acid (UFA) contents, in particular lower all-cis polyunsaturated fatty acid (PUFA) contents than the products described above, because the balance of SAFA and UFA or PUFA is largely determined by the amounts of hardstock and liquid oil in the margarine fat. This would seem to be the inevitable price to pay for not using fully hydrogenated oils. However, this conclusion is undesirable. There is therefore a need for margarine fats that are as good as the prior art products in respect of nutritional properties as well as the sensoric properties of the resulting spreads, but that have been produced without the use of hydrogenation.

We have now found that this objective can be reached to a considerable extent. Accordingly, the invention provides a margarine fatblend essentially comprising 86–95% liquid oil and 5–14% of a hardstock, this hardstock being a stearin fraction of an interesterified mixture of 25–65%, and preferably 35–55%, unhardened lauric fat stearin and 75–35%, and preferably 65–45%, unhardened $C_{16+}$ fat stearin. Preferred embodiments of this fatblend are given in claims 2–9. The invention further provides a plastic W/O emulsion spread comprising an aqueous phase and an oil phase predominantly consisting of the present margarine fat blend.

By selecting unhardened natural vegetable fat products having sufficient saturated fatty acids, such as lauric fat fractions and palm oil fractions for the interesterification, the chemical modification of the fats can be reduced to a minimum and the trans fatty acid level in the final fat blend can easily be limited to almost zero.

We were much surprised, however, that with our hardstock produced from unhydrogenated fat we could achieve quite similar results with respect to the nutritional properties of the spread as EP 89,082. EP 89,082 fully concentrates on achieving the minimum SAFA content within the boundaries of sensorically acceptable product properties. To this end it uses the full range of fat modification techniques including hydrogenation, chemical interesterification, solvent fractionation and even chemical synthesis of triglycerides. As will be further elucidated below, we found that with our approach we can even substantially match the performance of EP 89,082 without using solvent fractionation, chemical interesterification, or other chemical modification techniques. Just using the mildest biological and physical techniques of enzymatic interesterification, dry fractionation and blending these results can be obtained.

Furthermore, we found that with our approach compared to the products based on hydrogenated hardstocks as most commonly applied for these low SAFA W/O spreads, products with improved mouthfeel and oral melt can be obtained.

The terms "fat" and "oil" are used in this specification as synonyms. The term "hardstock" refers to fatty acid triglycerides of which at least the majority, preferably at least 90%, of the fatty acids are saturated. Such triglyceride mixtures are solid at ambient temperatures. The hardstock may comprises two or more different hard fats, i.e. it may consist of 2 or more stearin fractions, each being obtained by fractionating an interesterified mixture of 25–65% unhardened lauric fat stearin and 75–35% unhardened $C_{16+}$ fat stearin. A "margarine fat" is a fat blend which is suitable for use as the sole fat in plastic w/o spreads or in margarine; such a margarine fat usually includes a hardstock and a liquid oil. The term "liquid oil" is used in this specification for glyceride mixtures that are pourable at 5° C. Preferably the solid fat content of the liquid oil is 0 at 20° C., more preferably it is 0 at 15° C. Solid fats from which lower melting constituents have been removed will be indicated as "stearin fractions". A stearin fraction for the purpose of this description and claims is defined as a triglyceride mixture or fat blend from which at least 10% of the lower melting constituents have been removed by some kind of fractionation, e.g. dry fractionation, multi-stage countercurrent dry fractionation or solvent fractionation.

DETAILED DESCRIPTION OF THE PREFERRED EMBODIMENTS

In this specification all parts, proportions and percentages are by weight; the amount of fatty acids in an oil or fat is based on the total amount of fatty acids in said oil or fat and the amount of hardstock and/or hard fat in the fat composition is based on the total weight of said fat composition, unless otherwise stated.

The solid fat content (SFC) in this description and claims is expressed as N-value, essentially as defined in Fette, Seifen Anstrichmittel 80 180–186 (1978). The stabilisation profile applied is heating to a temperature of 80° C., keeping the oil for at least 10 minutes at 60° C. or higher, keeping the oil for 16 hours at 0° C. and then 30 minutes at the measuring temperature, except where indicated otherwise.

For reducing the level of saturated fatty acids and still obtaining an acceptable rheology of the spread finally prepared using the fat blend of this invention the interesterified mixture is fractionated and the lower melting constituents removed therefrom. In a more preferred embodiment the fractionation is conducted such that less than 15% and even more preferred less than 10% unsaturated fatty acid groups are remaining in the stearin fraction.

For reasons of "naturalness", i.e. minimal or no chemical modification, the interesterification preferably will be an enzymatically catalysed one with a conversion ratio preferably over 80%, more preferably over 90% and most preferably over 95%. In this art enzymatic reactions are considered not to involve a chemical modification. The "degree of conversion" or "conversion ratio" can suitably be assessed by using CN-number analysis as follows:

Degree of conversion $(x)=$ $$\frac{[CN_{44}+CN_{46}](x)-[CN_{44}+CN_{46}](0)}{[CN_{44}+CN_{46}](100)-[CN_{44}+CN_{46}](0)} \times 100\%$$

$CN_{44}$ and $CN_{46}$ indicate the amount of glycerides of which the fatty acid residues esterified on the glyceride together have 44 or 46 carbon atoms, respectively.

(0) indicates the mixture of the lauric fat stearin and the $C_{16+}$ fat stearin before start of the interesterification (100) indicates the mixture after the interesterification reaction has been carried out to completion (x) indicates the mixture of which the degree of conversion is to be determined.

Carbon number analysis is a well-known technique in the art. A suitable description is e.g. given in EP 78,568.

Also for reasons of naturalness, dry fractionated products are preferred over wet fractionated ones.

The enzymatic interesterification can suitably be done using 1,3 specific lipase as biocatalyst. We were surprised that with such an interesterification the desired results could be achieved. The unsaturated fatty acid residues which in practice are always present in unhardened lauric fat stearin and unhardened $C_{16+}$ fat stearin are enriched on the 2-position of the triglycerides. Thus, a relatively low amount of unsaturated fatty acids, e.g. 10%, corresponds to a substantially higher amount of unsaturated triglycerides, theoretically up to 30%. In 1,3 enzymic interesterification the fatty acids on the 2-position of the triglycerides do not change. We anticipated that this would result in a need to use more hardstock to obtain satisfactory products, but we found that with the present approach, this is not so.

In practice the lauric fats will be coconut oil, palm kernel oil or babassu oil, although in principle some more rare lauric fats can be used as well. By the term $C_{16+}$ fat stearins, stearins of natural fats are meant having at least 65% saturated fatty acids of a chain length of 16 C-atoms or more.

For improving the efficiency of the hardstock resulting from the interesterification reaction and reducing the relative amount to be used thereof to be able to provide a margarine fatblend with the desired low SAFA content, stearin fractions of the lauric fats must be used. In particular we found the use of a stearin fraction of palmkernel oil beneficial. The lauric fat stearin preferably comprises less than 15%, more preferably less than 10% unsaturated fatty acids. Other preferred features of the lauric fat stearin are:

| Property | Preferred | More preferred | Most preferred |
|---|---|---|---|
| I.V. | ≦15 | 5–12 | 6–9 |
| $C_8$–$C_{14}$ (%) | ≧70 | ≧75 | ≧80 |
| $C_{12}$–$C_{14}$ (%) | ≧65 | ≧70 | ≧75 |

$C_8$–$C_{14}$ indicates the combined amount of fatty acid residues of the fat having a chainlength of at least 8 and at most 14 carbon atoms. $C_{12}$–$C_{14}$ has a corresponding meaning. The stearin fraction of the lauric fat preferably has been produced by dry fractionation of the lauric fat, using methods well-known in the art.

Because of the reason expressed before the $C_{16+}$ fat stearins are stearins of unhardened natural fats, which contain preferably at least 80% and more preferably at least 90% saturated fatty acids. A suitable example of this fat being palm oil stearin. The $C_{16+}$ fat stearin can be obtained from a solvent or Lanza fractionation process. Preferably however it is prepared without using organic solvent or aqueous medium comprising surfactants, i.e. preferably it is prepared using dry fractionation, e.g. using a single or double stage dry fractionation to obtain the higher melting fraction. It is particularly preferred that the $C_{16+}$ fat stearin is prepared via a multi-stage counter current dry fractionation process. Such process is described in EP 399,597. Most preferred is a palm oil stearin prepared via such a process.

Other preferred features of the $C_{16+}$ fat stearin are:

| Property | Preferred | More preferred | Most preferred |
|---|---|---|---|
| Unsaturated fatty acid residues (%) | ≦20 | ≦15 | 7–10 |
| Iodine Value | ≦18 | 6–16 | 10–15 |
| $C_{16}$ content | ≧70 | 75–88 | 80–85 |

$C_{16}$ content indicates the content of palmitic acid residues of the fat.

To be able to obtain the desired low SAFA content in the margarine fatblend we found it necessary to use in the mixture to be interesterified 25–65% unhardened lauric fat stearin and 75–35% unhardened $C_{16+}$ fat stearin. At higher amounts of lauric stearin the desired low SAFA content could not be achieved. When using higher amounts of $C_{16+}$ fat stearin, we found, the organoleptic properties of the resulting spread were no longer good.

The structuring effect of the fat blend obtained by interesterification when used as a hardstock is optimal if in the interesterification reaction 35–55% of the lauric fat stearin and 45–65% of the $C_{16+}$ fat stearin are used.

The choice and amounts of unhardened lauric fat stearin and $C_{16+}$ fat stearin, and the degree of conversion in case of enzymatic interesterification are preferably chosen such that of the interesterified mixture the $CN_{44}+CN_{46}$ measured in Carbon Number analysis is at least 25, more preferably at least 27, especially 30–50. The $CN_{48+}$ preferably is at most 45, more preferably at most 40, especially 12–38. $CN_{48+}$ indicates the combined amount of $CN_{48}$ and higher carbon numbers, reflecting the total amount of triglycerides of which the 3 chains together have 48 or more carbon atoms.

To obtain the hardstock, the interesterified mixture must be fractionated to recover the stearin. This can be done using solvent fractionation, but preferably the stearin fraction is obtained via dry fractionation, e.g. via single or two-step fractionation to recover the higher melting fraction. E.g. in two-step fractionation first a stearin can be obtained which is then fractionated again and the stearin of this second stage fractionation can be used as the hardstock. The stearin can also be obtained by subjecting the interesterified mixture to multi-stage counter current dry fractionation to obtain the stearin. Whichever process is employed, preferably it is carried out such that the stearin obtained, to be used as hardstock, comprises less than 15%, more preferably less than 10%, in particular less than 9% unsaturated fatty acids. Other preferred features of the stearin are:

$CN_{44}+CN_{46}>25$, more preferably 30–60, especially 35–55, and $CN_{48+}<55$, more preferably <50, especially 20–48.

Of particular concern with respect to fractionation are the properties of the by-product obtained. Fractionation is an expensive process, and the yield of the fraction one primarily desires to recover can be small, often much less than 50%. If then the byproducts, the so-called secondary fraction or fractions, do not have attractive properties compared with commonly available oils and fats, the fractionation costs may make the entire proposition economically unfeasible. We have found that in the most preferred way of producing the hardstock with the properties as required for the present margarine fat blend, the fractionation of the interesterified mixture can surprisingly be effected in a dry fractionation process yielding as secondary product an olein fraction with very attractive properties.

Accordingly, the invention also provides a process for preparing a hardstock, suitable for use as hardstock in the present margarine fatblend, wherein a blend prepared of 25–65%, preferably 35–55% unhardened dry fractionated palmkernel stearin and 75–35%, preferably 65–45% unhardened dry fractionated palm oil stearin, the blend is enzymatically interesterified to a degree of conversion of at least 80%, preferably at least 90%, more preferably 95–100% the interesterified mixture is dry fractionated using a separation temperature of 31–42° C., preferably 33–38° C., and a stearin fraction is recovered The further preferred aspects relating to the preparation of the hardstock mentioned above are also preferred features of this process. The hardstock thus obtained is the most preferred hardstock used in the margarine fat blend. Preferably the fractionation of the interesterified mixture is a single stage dry fractionation yielding one stearin fraction and one olein fraction.

In a preferred embodiment from the fractionation step of the process also an olein fraction is recovered said olein fraction preferably having the following solid fat contents profile:

| Olein | Preferred | More preferred | Most preferred |
|---|---|---|---|
| $N_{10}$ | ≧89 | 90–97 | 91–95 |
| $N_{20}$ | 55–87 | 60–83 | 62–80 |
| $N_{30}$ | 6–35 | 10–32 | 15–30 |
| $N_{35}$ | 0–12 | 0–10 | 0–8 |

This olein is prepared without any chemical modification such as hydrogenation or chemical interesterification and without the use of solvent or Lanza fractionation. Yet it is eminently suitable for use as cooking or baking fat or for use in the preparation of such fats or of W/O emulsion spreads e.g. margarines, that are not designed to have a minimum SAFA content. Depending on the desired hardness of such spreads, this olein can suitably be incorporated in the margarine fat of such spreads at levels up to 50%, or even higher. The combined properties of low $N_{35}$, high $N_{20}$ and "naturalness" make this olein very attractive.

The margarine fat blend essentially comprises 86–95% liquid oil and 5–14% of the hardstock. By "essentially comprises" is meant that the margarine fat blend should not comprise more than 5% of other glyceride fat than liquid oil and hardstock. Preferably the margarine fat consist of 86–95% liquid oil and 5–14% of the hardstock, more preferably the margarine fat comprises 5–12%, especially 6–10% hardstock, the balance consisting of liquid oil.

Preferred liquid oils are low erucic acid rapeseed oil, soybean oil, sunflower oil, safflower oil, linseed oil, high oleic acid residue containing varieties of such oils, groundnut oil, olive oil and mixtures of 2 or more thereof. It is particularly preferred for the liquid oil to be chosen such that the ratio of ω6 and ω3 unsaturated fatty acids is between 20:1 and 2:1, especially between 10:1 and 5:1.

The plastic W/O emulsion spread comprises an aqueous phase and an oil phase predominantly consisting of the present margarine fat blend. The oil phase may comprise apart from the margarine fat blend, small amounts of additives as are commonly used in such products. It may for example comprise emulsifiers, flavours, colorants, vitamins etc. Similarly the aqueous phase may comprise apart from water, milk ingredients, flavour, preservatives, structuring and gelling agents, etc. The emulsion spread preferably comprises 10–85% oil phase and 90–15% aqueous phase.

Preferably the emulsion spread consists of 30–83% oil phase and 17–70% aqueous phase. Preferably the components used in the spread other than margarine fat blend are natural components rather than chemically produced ones.

The fats and fat components described herein may be wholly or partially refined before or after the treatments described in this specification, or such refining may be applied in between the described steps. In any case, the fats and fat components incorporated in consumable endproducts are fully refined, except for fats or components that don't need such refining, e.g. olive oil. For refining, conventional methods well used in the art, can be employed.

For a better understanding of the invention some practical embodiments thereof will be described in the following examples. Parts and percentages as used in these examples, the description and the claims refer to weights unless otherwise indicated. For manufacturing spreads may be referred to various text books, e.g. The Chemistry and Technology of Edible Oils and Fats and their High Fat Products by G. Hoffmann; Academic Press London 1989, page 319 ff and in particular page 320–321.

EXAMPLE I

A solvent fractionated palm oil stearin having a palmitic acid content of 77.9% and a dry fractionated palm kernel oil stearin having an unsaturated fatty acid content of 8.3% were blended in a ratio of 65:35 and subsequently chemically interesterified.

Subsequently, the reaction was subjected to a single stage acetone fractionation process, resulting in 68% of a stearin fraction, measured with NMR, containing 8.3% unsaturated fatty acids (UFA). Properties of the fractions used, the interesterified mixture and resulting stearin are summarized in Table 1.

TABLE 1

|  | Palm stearin | Palm kernel stearin | Interesterified mixture | Stearin of interesterified mixture |
|---|---|---|---|---|
| FAME |  |  |  |  |
| $C_8$ | — | 2.0 |  | 0.2 |
| $C_{10}$ | — | 2.9 |  | 0.6 |
| $C_{12}$ | 0.2 | 55.1 |  | 16.5 |
| $C_{14}$ | 1.5 | 20.7 |  | 8.4 |
| $C_{16}$ | 77.9 | 8.9 |  | 60.4 |
| $C_{18}$ | 5.4 | 2.0 |  | 4.9 |
| $C_{18:1}$ | 12.3 | 7.0 |  | 7.6 |
| $C_{18:2}$ | 2.0 | 1.2 |  | 0.7 |
| other | 0.7 | 0.2 |  | 0.7 |
| $C_{16+}$ saturated | 83.7 |  |  |  |
| Unsaturated | 14.5 | 8.3 |  | 8.3 |
| $C_8$–$C_{14}$ |  | 80.7 |  |  |
| $C_{12}$–$C_{14}$ |  | 75.8 |  |  |
| CN |  |  |  |  |
| $CN_{44}$ + $CN_{46}$ |  |  | 36.3 | 39.2 |
| $CN_{48+}$ |  |  | 34.3 | 39.2 |

The resulting stearin product was used as a hardstock and blended with fully refined sunflower oil in a ratio of 8:92. The SAFA content of this margarine fat blend was 17%. The content of trans unsaturated fatty acids was less than 1%

From this blend a spread was manufactured, having the following composition:

| 69.55% | fat blend |
| 0.15% | Admul 6203 (monoglyceride emulsifier ex Quest, Naarden, Netherlands) |
| 0.2% | cetinol (commercial ethanol-soluble lecithin fraction ex Unimills Zwijndrecht Netherlands) |
| 0.1% | β-carotene (0.4%) |
| 29.3% | water |
| 0.6% | skimmed milk powder |
| 0.1% | potassium sorbate |

The mixture was processed at laboratory scale through a contentional A-A-C- sequence with a throughput of 5.6 kg/h, an exit temperature on the second A-unit (800 rpm) of 7.7° C. and an exit temperature on the C-unit (100 rpm) of 8.7° C.

The N-line of the blend (measured both with 1 hour and with 16 hours stabilisation at 0° C.) and the hardness of the resulting spread are given in Table 2.

TABLE 2

| Stabilisation at 0° C. | 1 hour | 16 hours |
|---|---|---|
| N10 | 7.8 | 8.3 |
| N20 | 4.2 | 4.8 |
| N30 | 2.3 | 2.5 |
| N35 | 0.7 | 0.6 |
| St 5 | 62 |  |
| St 10 | 52 |  |
| St 15 | 47 |  |
| St 20 | 31 |  |

The Stevens hardness St at a certain temperature t is determined after storage of 1 day at 15° C., then 1 week at 5° C. and thereafter 1 day equilibration at t° C., using a 6.35 mm Ø cylinder in a Stevens-LFRA Texture Analyzer (ex Stevens Advanced Weighing Systems, Dunmore, U.K.) load range 1000 g operated "normal" and set at 10 mm penetration depth and 2.0 mm/s penetration rate.

EXAMPLE II

A multi stage countercurrent dry fractionated palm oil stearin having a palmitic acid content of 79.4% and a dry fractionated palm kernel oil stearin having an unsaturated fatty acid content of 8.1% were blended in a ratio of 50:50 and subsequently interesterified using an enzyme as catalyst.

The enzymatic interesterification reaction was carried out in a labscale packed bed ractor which contained 75 g of the supported enzyme SP392 (commercially available from Novo). The reaction temperature was 75° C. and the flow was 50 g/hour. These reaction conditions resulted in a conversion of 97% calculated on the basis of carbon number analysis.

Subsequently the reaction product was fractionated using a single stage dry fractionation process, resulting in 30% stearin fraction having 6.0 UFA and a composition as shown in Table 3. The separation temperature was 35° C. Some further data on the starting materials used and the interesterified mixture are also given in Table 3.

TABLE 3

| | Palm oil stearin | Palm kernel fat stearin | Interesterified mixture | Final stearin fraction |
|---|---|---|---|---|
| FAME/% | | | | |
| $C_{8:0}$ | 0.0 | 1.7 | | 0.5 |
| $C_{10:0}$ | 0.0 | 2.6 | | 0.8 |
| $C_{12:0}$ | 0.2 | 54.0 | | 20.0 |
| $C_{14:0}$ | 1.3 | 22.2 | | 11.3 |
| $C_{16:0}$ | 79.4 | 8.9 | | 56.4 |
| $C_{18:0}$ | 4.8 | 2.3 | | 4.3 |
| $C_{18:1}$ | 10.8 | 6.8 | | 5.1 |
| $C_{18:2}$ | 2.1 | 1.1 | | 0.8 |
| $C_{20:0}$ | 0.3 | 0.1 | | 0.2 |
| $C_{20:1}$ | 0.2 | 0.2 | | 0.1 |
| $C_{22:0}$ | 0.1 | 0.0 | | 0.4 |
| $C_{22:1}$ | 0.2 | 0.0 | | 0.0 |
| others | 0.6 | 0.1 | | 0.1 |
| $C_{16}$ + saturated | 84.6 | | | |
| Unsaturated | 13.3 | 8.1 | | 6.0 |
| $C_8$–$C_{14}$ | | 80.5 | | |
| $C_{12}$–$C_{14}$ | | 76.2 | | |
| CN | | | | |
| $CN_{44}$ + $CN_{46}$ | | | 32.9 | 39.4 |
| $CN_{48+}$ | | | 22.8 | 31.7 |

This final stearin fraction was used as a hardstock and blended with fully refined sunflower oil in a ratio of 8:92 to give a margarine fat blend. The SAFA content of the blend was 18%, the content of trans unsaturated fatty acid residues was negligible. From this blend a spread was manufactured with a composition as described in example I.

The mixture was processed at laboratory scale through a conventional A-A-C sequence with a throughput of 5.6 kg/h, an exit temperature on the second A-unit (800 rpm) of 7.7° C. and an exit temperature on the C-unit (100 rpm) of 8.8° C.

The N-line of the blend (measured with 1 hour and with 16 hours stabilisation at 0° C.) and the hardness of the resulting spread are given in Table 4.

TABLE 4

| Stabilisation | 1 hour | 16 hours |
|---|---|---|
| N10 | 7.0 | 7.6 |
| N20 | 4.2 | 4.7 |
| N30 | 1.6 | 1.9 |
| N35 | 1.0 | 1.0 |
| St 5 | 65 | |
| St 10 | 49 | |
| St 15 | 50 | |
| St 20 | 38 | |

The product showed good spreadability properties, plasticity and exhibited excellent melting behaviour.

The olein fraction obtained as a byproduct of the fractionation of the interesterified mixture had the following N-values:

| $N_5$ | 92.6 |
|---|---|
| $N_{10}$ | 91.6 |
| $N_{20}$ | 71.7 |
| $N_{30}$ | 25.3 |
| $N_{35}$ | 3.9 |

For comparison, a spread was prepared in a similar way except that as hardstock 8% of a solvent fractionated stearin of a randomly interesterified mixture of 50 parts fully hardened palmkernel oil and 50 parts fully hardened palm oil was used. The spread obtained was very similar with respect to firmness and spreadability. The SAFA content of this comparative product was very slightly higher. However, in a blind panel evaluation, the product of the invention was clearly preferred because its organoleptic properties were found to be better. This illustrates that with the present invention not only "naturalness" can be achieved without any adverse effect on the nutritional quality of the product, but even sensorically more attractive products can be obtained compared with the prior art.

EXAMPLES III–IV

Margarine fat blends were produced as described in Example II using the same raw materials except that different mixing ratio's of palm stearin and palmkernel stearin were employed. Mixing ratio's used, separation temperature applied and results obtained for the hardstock are summarized in Table 5.

TABLE 5

| Example | Comp. 1 | Ex. III | Ex. IV |
|---|---|---|---|
| Mixing ratio | | | |
| Palm stearin | 30 | 40 | 60 |
| Palmkernel stearin | 70 | 60 | 40 |
| Interesterified mixture | | | |
| $CN_{44}$ + $CN_{46}$ | 25.0 | 26.7 | 31.1 |
| $CN_{48+}$ | 10.4 | 12.5 | 32.4 |
| Separation temp. | 32° C. | 35° C. | 38° C. |
| Stearin yield | 24% | 14% | 37% |
| FAME of stearin | | | |
| $C_8$ | 0.7 | 0.7 | 0.4 |
| $C_{10}$ | 1.2 | 1.1 | 0.6 |
| $C_{12}$ | 30.8 | 26.3 | 15.0 |
| $C_{14}$ | 16.4 | 14.9 | 8.6 |
| $C_{16}$ | 40.1 | 45.6 | 65.1 |
| $C_{18}$ | 5.8 | 6.0 | 4.4 |
| $C_{18:1}$ | 4.0 | 4.1 | 4.6 |
| $C_{18:2}$ | 0.6 | 0.7 | 0.8 |
| other | 0.4 | 0.6 | 0.5 |
| Unsaturated | 4.7 | 4.9 | 5.4 |
| CN of stearin | | | |
| $CN_{44}$ + $CN_{46}$ | 35.9 | 37.2 | 33.8 |
| $CN_{48+}$ | 15.1 | 21.4 | 45.9 |

Margarine fats were produced by mixing 8 or 10% of hardstock with 92% or 90% of sunflower oil. To facilitate comparison, such margarine fats were also prepared for the hardstock of Example II. The margarine fats had the N-values as shown in Table 6. The trans fatty acid residue content was negligible in all cases. The SAFA contents of the blends with 8% hardstock was slightly less than 18%. That of the blends with 10% hardstock was just over 19%.

TABLE 6

| | Comp. 1 | Ex. III | Ex. II | Ex. IV |
|---|---|---|---|---|
| 8% hardstock | | | | |
| $N_5$ | 8.2 | 8.5 | 8.9 | 9.9 |
| $N_{10}$ | 6.7 | 6.8 | 7.6 | 8.6 |
| $N_{15}$ | 4.8 | 5.4 | 5.9 | 7.1 |
| $N_{20}$ | 3.5 | 3.7 | 4.8 | 6.3 |

TABLE 6-continued

|  | Comp. 1 | Ex. III | Ex. II | Ex. IV |
|---|---|---|---|---|
| $N_{25}$ | 1.2 | 2.2 | 3.5 | 4.8 |
| $N_{30}$ | 0.1 | 0.9 | 1.8 | 3.8 |
| $N_{35}$ | 0 | 0 | 0.8 | 2.7 |
| 10% hardstock | | | | |
| $N_5$ | 10.5 | 10.2 | 10.9 | |
| $N_{10}$ | 8.7 | 9.2 | 9.7 | |
| $N_{15}$ | 6.4 | 7.0 | 7.6 | |
| $N_{20}$ | 4.0 | 4.7 | 6.1 | |
| $N_{25}$ | 1.9 | 2.8 | 4.6 | |
| $N_{30}$ | 0.5 | 1.9 | 3.0 | |
| $N_{35}$ | 0.1 | 0.2 | 1.8 | |

Of the hardstock of Ex. IV only a blend with 8% was prepared since this blend was already rather firm. In order to be able to make a spread with minimum SAFA content, yet obtain a product with sufficient firmness, good spreadability and sufficient stability to withstand keeping the product for limited periods of time outside the refrigerator, preferably $N_{10}$ is at least about 8 and $N_{20}$ is at least about 4.5.

The above results show that when using 30% palm oil stearin and 70% palmkernel stearin (Comparison 1), the $N_{20}$ target is not met even if 10% hardstock is used.

With 40% palm stearin and 60% palmkernel stearin (Ex. III), the targets can be met at about 9%–10% hardstock level, which make this hardstock just acceptable with respect to these standards. The hardstocks of Ex. II and Ex. IV are clearly better and can be used at 8% level or possibly even lower. Furthermore, the stearin yields in these cases (30 and 37%) are clearly higher which also is attractive. These results illustrate the preferred range of lauric stearin and $C_{16+}$ fat stearin ratio's to be used in the mixture to be interesterified.

Comparison of the results of Ex. II and Ex. IV with those reported in Table 4 of EP 89,082 illustrates that the present natural hardstocks can provide as much firmness to the margarine fat at comparable SAFA contents as those of EP 89,082 which were produced using hydrogenation, chemical interesterification and solvent fractionation.

In CA 2,098,314 the trials are not described in sufficient detail to allow direct comparison or repetition. However, since the liquid oil content of the margarine fats can be at most 86%, while 84% is the most preferred, the SAFA content of the products of CA 2,098,314 must be notably higher while the UFA and especially the PUFA content will be lower. This conclusion is consistent with the solid fat contents as a function of temperature prescribed for the hardstock of CA 2,098,314. Taking into account the differences in methods for measuring the solid fat contents, the data of CA 2,098,314 suggest that their hardstock would have much less structuring ability than the present hardstock.

The oleins obtained as byproducts of the hardstock productions had the following N-lines:

| Olein | Comp. 1 | Ex. III | Ex. IV |
|---|---|---|---|
| $N_5$ | 92.6 | 93.2 | 92.8 |
| $N_{10}$ | 90.3 | 93.1 | 91.7 |
| $N_{20}$ | 67.2 | 73.9 | 71.7 |
| $N_{30}$ | 11.4 | 24.2 | 28.8 |
| $N_{35}$ | 0 | 1.8 | 8.9 |

EXAMPLES V–VI

Margarine fats were prepared as described in the previous example using the hardstocks of Ex. II and Ex. IV except that low erucic acid rape seed oil was used in stead of sunflower oil. The N-values obtained were very similar, but the SAFA contents of the fatblends were about 11% and 13% for the blends with 8% and 10% hardstock respectively.

EXAMPLE VII

A spread was prepared as described in example II except that as margarine fat a blend of 7.5% of the hardstock of Ex. IV and 92.5% of sunflower oil was used. The SAFA content of the blend was 17%.

The margarine fat had the following N-lines:

| Stabilisation at 0° C. | 1 hour | 16 hours |
|---|---|---|
| $N_5$ | 8.6 | 9.0 |
| $N_{10}$ | 7.3 | 7.9 |
| $N_{20}$ | 4.9 | 5.4 |
| $N_{30}$ | 2.8 | 2.9 |
| $N_{35}$ | 1.9 | 1.7 |

The Stevens values of the spread were:

| St 5 | 47 |
|---|---|
| St 10 | 42 |
| St 15 | 44 |
| St 20 | 32 |

In panel evaluation the product was judged to be very good.

EXAMPLE VIII

A spread was prepared in a manner similar as described in Example I, except that the mixture to be interesterified comprised 57 parts of the palm oil stearin and 43 parts of the palmkernel stearin. The margarine fat blend comprised 8% of the stearin fraction obtained from fractionation in acetone of the randomly interesterified mixture, 62% low erucic acid rapeseed oil and 30% of a high oleic acid residue containing variety of linseed oil. A very good product was obtained.

The fat of the spread had a SAFA content of 14.5%, the balance consisting of cis-unsaturated fatty acids. The ratio of ω6 to ω3 unsaturated acids was 4.5:1.

EXAMPLE IX

Using the oleinfraction of example II, a series of margarine fats were prepared by blending the olein fraction with sunflower oil, dry fractionated palm oil stearin having a slip melting point of 52° C., and in 2 cases palmkernel oil. The compositions and the resulting N-lines are given in table 7.

TABLE 7

| Margarine fat | A | B | C | D | E | F | G | H | I |
|---|---|---|---|---|---|---|---|---|---|
| composition olein of Ex. II | 13 | 25 | 15 | 30 | 40 | 25 | 23 | 20 | 20 |

TABLE 7-continued

| Margarine fat | A | B | C | D | E | F | G | H | I |
|---|---|---|---|---|---|---|---|---|---|
| palm-stearin | 12 | 5 | 15 | 20 | 10 | 5 | 5 | — | 5 |
| palm-kernel oil | — | — | — | — | — | 10 | 15 | — | — |
| sunflower oil | 75 | 70 | 70 | 50 | 50 | 60 | 57 | 80 | 75 |
| N10 | 15.2 | 20.8 | 18.8 | 35.5 | 37.9 | 26.6 | 28.9 | 13.2 | 14.1 |
| N20 | 7.9 | 9.6 | 10.0 | 20.7 | 21.4 | 11.7 | 13.6 | 5.1 | 6.2 |
| N30 | 3.7 | 2.0 | 4.8 | 8.9 | 6.7 | 1.7 | 2.2 | 0.5 | 1.2 |
| N35 | 2.3 | 0.4 | 3.2 | 4.6 | 1.6 | 0.1 | 0.6 | 0 | 0 |

With these margarine fats, spreads are produced as follows:
fat phase composition:

> 70 parts margarine fat
> 0.2 parts lecithin
> 0.2 parts monoglyceride
> p.m. flavour
> p.m. β-carotene solution
> aqueous phase composition:
>
> 28 parts water
> 2 parts skimmilk powder
> 0.1 part salt
> p.m. flavour
> p.m. citric acid to pH 4.5.

With margarine fats D and E, wrapper products are prepared by combining 70 parts of fatphase composition of 60° C. with 30 parts aqueous phase composition and passing the product through a Votator line with C-A-A-A-B sequence. A is a scraped surface heatexchanger, C is a stirred crystallizer, B is a resting tube with sieve plates. Recirculation is applied by taking part of the stream from after the second A-unit and recirculating it and feeding it into the entrance of the C-unit. The product after the third A-unit has a temperature of 10° C. The product leaving the B-unit is fed to a packing machine where it is packed in wrappers.

For the other margarine fats, the spreads are produced in a similar way except that an A-A-C sequence is applied, without recirculation, and that the product is packed in tubs.

EXAMPLES X–XII

The hardstocks of examples X, XI and XII were prepared in a similar way as described in Examples I, II and IV, respectively, except that they were prepared on pilot plant scale and that for the enzymatic interesterification of examples XI and XII, degrees of conversion of 92% were applied. Briefly, these hardstocks are:

Ex. X: solvent fractionated stearin fraction of a chemically interesterified mixture of 65% solvent fractionated palmstearin and 35% dry fractionated palmkernel stearin.

Ex. XI: dry fractionated stearin fraction of an enzymatically interesterified (92% conversion) mixture of 50% multistage countercurrent dry fractionated palm stearin and 50% dry fractionated palmkernel stearin.

Ex. XII: as Ex XI except that mixture of 60% palmstearin and 40% palmkernel stearin was applied.

The cooling profile applied for the fractionation of the interesterified mixture was the same for examples XI and XII: rapid cooling from 70° C. to 42° C., maintaining for 1 hour at 42° C., slow cooling from 42° C. to 35° C., maintaining at 35° C. for several hours and then separating. During separation, initially a pressure of 2 bar was applied which was gradually increased to 12 bar. The stearin yield was 33% for Ex. XI and 45% for Ex. XII The stearin and olein fractions of Ex. XI and Ex. XII and the stearin of Ex. X had the properties as shown in table 8

TABLE 8

| | Stearins | | | Oleins | |
|---|---|---|---|---|---|
| | Ex X | Ex XI | Ex. XII | Ex XI | Ex XII |
| N-values* | | | | | |
| N10 | | 96.9 | 97.2 | 92.3 | 92.2 |
| N20 | 96.5 | 96.3 | 96.5 | 71.9 | 71.8 |
| N30 | 91.2 | 84.8 | 87.7 | 27.0 | 29.1 |
| N35 | 74.8 | 72.7 | 77.8 | 5.7 | 8.8 |
| N40 | 49.1 | 51.0 | 61.6 | 0.0 | 0.0 |
| C12 | | 19.5 | 15.6 | 31.6 | 27.1 |
| C14 | | 10.8 | 8.5 | 10.8 | 9.2 |
| C16 | | 60.0 | 65.9 | 39.9 | 44.9 |
| C18 | | 4.0 | 4.1 | 2.9 | 2.9 |
| C18:1 | | 3.6 | 3.8 | 9.4 | 10.4 |
| C18:2 | | 0.6 | 0.7 | 1.9 | 2.1 |
| other | | 1.5 | 1.4 | 2.5 | 3.4 |
| CN44 + CN46 | | 41.9 | 39.0 | | |

*N-values measured with 1 hour stabilisation at 0° C.

The hardstocks were refined in conventional manner.

Margarine fats were prepared by blending 8% of the hardstocks with 92% refined sunflower oil. The blends had the following N-lines (measured at 1 hour stabilisation at 0° C.).

TABLE 9

| | Ex X | Ex XI | Ex XII |
|---|---|---|---|
| N10 | 8.3 | 7.7 | 8.6 |
| N20 | 4.8 | 5.0 | 5.9 |
| N30 | 2.1 | 2.6 | 3.6 |
| N35 | 0.6 | 1.5 | 2.4 |

Using these margarine fats, spreads were prepared from the following composition.

Fat phase:
   69.82% margarine fat
   0.13% lecithin
   0.05% colour, flavour, emulsifier, etc.
Water phase:
   29.61% water
   0.28% wheypowder
   0.11% acid, preservative, etc.

The spreads were processed on a pilot plant Votator line starting from a premix of the phases at 55° C. and using a sequence of A-A-A-C. The C-unit was operated at 50 rpm and the product left the C-unit in all cases at a temperature between 7.5 and 8° C. The products were filled into tubs and stored at 5° C. They were evaluated after 1 week storage. All three products were found to be good.

What is claimed is:

1. Margarine fat blend essentially comprising 86–95% liquid oil and 5–14% of a hardstock, this hardstock being a stearin fraction of an interesterified mixture of 25–65%, unhardened lauric fat stearin and 75–35% unhardened $C_{16+}$ fat stearin.

2. Fat blend according to claim 1, wherein the mixture has been enzymatically interesterified with a degree of conversion over 80%.

3. Fat blend according to claim 1, wherein the interesterified mixture has been dry fractionated at least once.

4. Fat blend according to claim 1, wherein the $C_{16+}$ fat stearin has been obtained by multi-stage, countercurrent dry fractionating $C_{16+}$ fat.

5. Fat blend according to claim 1, wherein the interesterified mixture has been solvent fractionated.

6. Fat blend according to claim 1, wherein the lauric fat stearin has an unsaturated fatty acid content $\leq 15\%$.

7. Fat blend according to claim 1, wherein the $C_{16+}$ fat stearin has an unsaturated fatty acid content $\leq 20\%$.

8. Fat blend according to claim 1, wherein the final stearin fraction has an unsaturated fatty acid content $\leq 15\%$.

9. Fat blend according to claims 1, comprising 5–12% of the hardstock.

10. Plastic w/o emulsion spread comprising an aqueous phase and an oil phase predominantly consisting of the margarine fat blend of claim 1.

11. A composition according to claim 1, wherein Stevens hardness, St, of said composition is:

St5=about 65;

St10=about 49;

St15=about 50; and

St20=about 38.

12. A margarine fat blend comprising 86–95% liquid oil and 5–14% of a hardstock, this hardstock being a stearin fraction of an interesterified mixture of 25–65% unhardened lauric fat stearin and 75–35% unhardened C16+ fat stearin, wherein said margarine fat blend has spreadability, consistency and mouthfeel.

13. A margarine fat blend comprising 86–95% liquid oil and 5–14% of a hardstock, this hardstock being a stearin fraction of an interesterified mixture of 25–65% unhardened lauric fat stearin and 75–35% unhardened C16+ fat stearin, wherein said unhardened C16+ fat stearin is prepared by dry fractionation.

* * * * *